United States Patent
Dokter et al.

(10) Patent No.: US 6,225,280 B1
(45) Date of Patent: *May 1, 2001

(54) COMPACTED SODIUM SILICATE

(75) Inventors: Willem Hendrik Dokter, Amsterdam; Hubertus Josephus Maria De Koning, Geleen, both of (NL)

(73) Assignee: Akzo-PQ Silica Vof, Amersfoort (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,712

(22) Filed: May 5, 1998

Related U.S. Application Data

(63) Continuation of application No. PCT/EP96/04804, filed on Nov. 2, 1996.

(30) Foreign Application Priority Data

Nov. 9, 1995 (EP) .................................................. 95203045

(51) Int. Cl.⁷ .................................................. C01B 33/32
(52) U.S. Cl. ........................................... 510/511; 423/332
(58) Field of Search ............................. 423/332; 510/511

(56) References Cited

U.S. PATENT DOCUMENTS

| | | | |
|---|---|---|---|
| 3,839,226 | * 10/1974 | Yates | 423/332 |
| 3,918,921 | 11/1975 | Pierce | 23/313 |
| 3,931,036 | 1/1976 | Pierce | 252/135 |
| 5,229,095 | 7/1993 | Schimmel et al. | 423/334 |
| 5,236,682 | 8/1993 | Schimmel et al. | 423/334 |
| 5,286,470 | * 2/1994 | Delwel | 423/332 |

FOREIGN PATENT DOCUMENTS

| | | | |
|---|---|---|---|
| 0 425 427 | 5/1991 | (EP) | C01B/33/32 |
| 0 486 078 | 5/1992 | (EP) | C01B/33/32 |
| 0 486 079 | 5/1992 | (EP) | C01B/33/32 |

* cited by examiner

*Primary Examiner*—Stuart L. Hendrickson
(74) *Attorney, Agent, or Firm*—Ralph J. Mancini

(57) ABSTRACT

The present invention relates to a compacted sodium silicate is provided having a molar ratio $SiO_2:Na_2O$ from 1.6 to 3.3, characterized in that the silicate has the following properties:

- a bulk density of above 500 g/l,
- a porosity of above 190 ml/kg, and
- a mechanical strength corresponding to a dust percentage of below 40 wt %.

Also provided is a process for preparing such silicate comprising the steps of:

- spray-drying an aqueous solution of sodium silicate with a molar ratio $SiO_2:Na_2O$ from 1.6 to 3.3, applying an outlet temperature above 114° C.,
- applying a water glass solution to the spray-dried powder,
- subjecting the water glass treated powder to a compacting step, applying a pressure below 100 bar, and
- crushing the resulting flakes having a thickness of above 4 mm to obtain the compacted sodium silicate.

20 Claims, No Drawings

COMPACTED SODIUM SILICATE

The present application is a continuation of International application No. PCT/EP96/04804 filed on Nov. 2, 1996.

FIELD OF THE INVENTION

The present invention relates to compacted sodium silicate, a method for the preparation of said silicate and its use in cleaning compositions.

BACKGROUND OF THE INVENTION

Sodium metasilicate, i.e., sodium silicate having a molar ratio $SiO_2:Na_2O$ of about 1, is frequently used in cleaning products such as detergents and dishwashing agents. The silicate inhibits corrosion on glass, glazing, and metal parts, and also functions as an alkali generating agent. Generally, granules of pentahydrate are used, which granules dissolve quickly in water. However, many products contain metasilicate in such a high amount that a very high alkalinity is obtained, which renders the products corrosive and unpleasant to handle.

Accordingly, the first requirement for products containing sodium silicate is to lower their alkalinity. Lower alkalinity but the same protection against corrosion can be obtained by the use of sodium silicates having a higher molar ratio $SiO_2:Na_2O$, for example disilicates with a ratio of about 2. However, higher ratios also can be employed, i.e., up to a ratio of 3.3.

Preference is also given to an amorphous product over a crystalline product. The preparation process for crystalline products is more elaborate than for amorphous products, in view of the extra high temperature treating step which has to be applied. Also, it is more difficult to compact crystalline sodium silicate, and the resulting product has a high amount of dust.

Furthermore, a compacted sodium silicate is required for ease of handling of the product by producers and detergent manufacturers. Powders are more difficult to handle, in view of dust.

For use in highly concentrated cleaning products it also is highly desirable for the silicate to have the highest possible bulk density. However, this bulk density should not have an adverse effect on the dissolution of the compacted sodium silicate in water.

In addition to the above, the compacted sodium silicate serves as a carrier for, e.g., surfactants and other washing aids, such as polycarboxylates. This requires a high porosity of the compacted silicate, to give a high loading capacity.

Finally, the compacted sodium silicate is required to have a high mechanical strength. As used herein, mechanical strength is defined as the inverse of the weight percentage of dust with a particle size below 400 $\mu$m, resulting from a milling operation of compacted silicate with a particle size between 400 and 1000 $\mu$m, as will be described hereinafter. A high mechanical strength, therefore, results in a low percentage of dust, which is an advantage when handling the product after preparation but especially avoids dust problems during various after treatments, such as adsorption of the above-mentioned washing aids, and introduction into the cleaning composition.

Compacted sodium silicate is known from U.S. Pat. No. 3,931,036. However, the disclosed product lacks the required porosity and mechanical strength. Furthermore, it is prepared according to a spray-drying technique known in the art. Accordingly, the outlet temperature required in the process of the present invention has not been applied in the process of this disclosure.

Compacted sodium silicate is also known from EP-A-0 486 078 and EP-A-0 486 079. Again, the products disclosed do not have the required porosity and mechanical strength. Also, as mentioned above, a normal sprayrying technique is applied, requiring an outlet temperature substantially lower than that of the process of the present invention.

The object of the present invention is to provide a compacted amorphous sodium silicate having the above-mentioned properties. More particularly, the invention concerns compacted sodium silicate having a molar ratio $SiO_2:Na_2O$ from 1.6 to 3.3, characterized in that the silicate has the following properties:

a bulk density of above 500 g/l, a porosity of above 190 ml/kg, and a dust percentage of below 40 wt %.

SUMMARY OF THE INVENTION

The present invention generally relates to compacted sodium silicate having a molar ratio $SiO_2:Na_2O$ from 1.6 to 3.3, wherein the silicate has the following properties:

a bulk density of above 500 g/l, a porosity of above 190 ml/kg, and a mechanical strength such that the dust percentage is below 40 wt %.

The invention also relates to process for the preparation of compacted sodium silicate described above, said process comprising the steps of:

spray-drying an aqueous solution of sodium silicate with a molar ratio $SiO_2:Na_2O$ from 1.6 to 3.3, applying a water glass solution to the spray-dried powder, subjecting the water glass treated powder to a compacting step, applying a pressure below 100 bar, and crushing the resulting flakes having a thickness of above 4 mm to obtain the compacted sodium silicate, wherein during the spray drying step an outlet temperature above 114° C. is applied.

Finally, the invention discloses the use of the compacted sodium silicate in a cleaning composition.

DETAILED DESCRIPTION OF THE INVENTION

As described above, the present invention relates to compacted sodium silicate having a molar ratio $SiO_2:Na_2O$ from 1.6 to 3.3, wherein the silicate has the following properties a bulk density of above 500 g/l, a porosity of above 190 ml/kg, and a mechanical strength such that the dust percentage is below 40 wt %; and to a process for the preparation of same. In the compacted sodium silicate of the invention also small amounts of potassium oxide and/or soda ash may be present. Preferably, up to 5 wt % potassium oxide, more preferably 1 to 5 wt %, and/or up to 10 wt % soda ash, more preferably 5 to 10 wt %, are present in the sodium silicate.

It is preferred that the compacted sodium silicate have a bulk density which ranges from 600 to 1000 g/l.

It is also preferred that the compacted sodium silicate have a porosity of above 200 ml/kg, preferably from 200 to 300 ml/kg. By porosity is meant the porosity of the compacted sodium silicate, not the internal porosity of sodium silicate powder.

Furthermore, it is preferred that the mechanical strength of the compacted sodium silicate is such that the dust percentage is below 35 wt %. The dust percentage is measured by subjecting compacted sodium silicate having a certain particle size distribution to milling in the presence of stainless steel balls.

The compacted sodium silicate of the present invention is preferably prepared in the form of granules. It is also preferred that 96–100 wt % of these granules have a particle size above 250 μm and 0–20 wt % of these granules have a particle size above 1000 μm.

Finally, it is preferred that the molar ratio of $SiO_2:Na_2O$ of the compacted solid sodium silicate ranges from 2 to 3.3. More preferably the molar ratio of $SiO_2:Na_2O$ of the silicate is between 2.6 and 3.3, since under government regulations labels of cleaning compositions comprising sodium silicates having a molar ratio equal to or below 2.6 have to show a black cross, indicating that the composition may be injurious to eyes. With a molar ratio of $SiO_2:Na_2O$ greater than 2.6, such a label is no longer required.

The water content of the granule may be between 10 and 30 wt %, preferably 10 to 20 wt %.

A preferred compacted sodium silicate is amorphous and has a molar ratio of $SiO_2:Na_2O$ of about 2.65, a bulk density of about 630 g/l, a porosity of about 225 ml/kg, a mechanical strength corresponding to a dust percentage of about 31 wt %, and a water content of 18 wt %. Surprisingly, it has been found that although the water content is fairly high, the porosity remains high too.

The present invention also relates to a method for preparing the compacted sodium silicate according to the above description by:

spray-drying an aqueous solution of sodium silicate with a molar ratio $SiO_2:Na_2O$ from 1.6 to 3.3, applying an outlet temperature above 114° C., applying a water glass solution to the spray-dried powder, subjecting the water glass treated powder to a compacting step, applying a pressure below 100 bar, and crushing the resulting flakes having a thickness of above 4 mm to obtain the compacted sodium silicate.

The spray-drying technique applied in the process of the present invention are well known to those of ordinary skill in the art, except for the outlet temperature. It has been established that the outlet temperature of the spraydrier, which is normally around 110° C., should be increased to obtain a sodium silicate having the above-mentioned properties. Accordingly, an outlet temperature of above 114° C. is required, preferably above 117° C., more preferably from 117 to 130° C. Although these changes in outlet temperature appear to be minor, it is known to the skilled man that a change of 1° C. in the outlet temperature already results in a product with different properties. Accordingly, a change of 4° C. is regarded as a considerable increase in outlet temperature.

The maximum amount of dry material substance in the aqueous solution of sodium silicate to be spray-dried depends on the solubility of the dry material. All of the dry material should stay in solution. Preferably, the dry material substance is present in an amount above 20 wt %, preferably from 20 to 50 wt %, more preferably from 30 to 50 wt %.

If potassium oxide or soda ash is desired or required in the compacted sodium silicate, a potassium compound providing potassium oxide and/or soda ash is dissolved in the aqueous solution of sodium silicate prior to spray-drying. Examples of potassium oxide providing compounds are potassium carbonate, potassium hydroxide, and potassium silicate. Potassium oxide providing compounds are incorporated in the amounts specified above, i.e., up to 5 wt %. Soda ash is incorporated in an amount up to 10 wt %.

The application of the water glass solution to the spray-dried powder can be carried out in almost any standard device, such as twin shell blenders, ribbon blenders, or in rotating drums provided with sprayers. Preferably, the water glass solution has a dry material substance of 20 to 50 wt %, more preferably 30 to 50 wt %. It is also preferred to apply 3 to 12% by weight of water glass solution, based on the sodium silicate powder. The water glass solution has a molar ratio $SiO_2:Na_2O$ of 1.6 to 3.3, preferably of from 2 to 3.3, more preferably of from above 2.6 to 3.3. Most preferably, the molar ratio of the water glass solution is equal to the molar ratio of the sodium silicate powder.

It has been observed that one of the results of the use of the water glass solution is that a lower pressure can subsequently be applied to the water glass treated powder to reach the same kind of mechanical strength as in the case of compacting without the prior step of water glass application. Lower compacting pressure leads also to higher porosity.

The water glass treated powder is then subjected to a compacting step in which a pressure of less than 100 bar is applied. Such a compacting step may be carried out between compression rollers. Preferably, the applied pressure is below 90 bar, preferably ranging from 70 to 90 bar.

The product of the compacting step takes the form of flakes with a thickness of above 4 mm, preferably ranging from 6 to 10 mm. These flakes are easily granulated by crushing in various types of mills. The resulting granules are screened and those that are larger than desired are regranulated, while the fines are completely recycled.

Finally, the invention concerns the use of the compacted sodium silicate in a cleaning composition. This composition may be a detergent or dishwashing composition. The composition contains about 1 to 40 wt %, preferably 5 to 40 wt %, of the compacted sodium silicate according to the invention, and one or more other active cleaning substances, for example surfactants, other alkali generating agents, bleaching agents or enzymes. The cleaning composition is usually prepared by dry-mixing the necessary components.

Test Methods

Bulk Density

The bulk density of the compacted silica was measured in accordance with ISO 3424-1975(E).

Porosity

About 3 to 4 g of a sample of compacted sodium silicate with an accuracy of 1 mg ($M_0$) are weighed into an inner centrifugal tube. The inner tube with sample is soaked in sufficient dibutyl phthalate (about 4 ml) for 4 to 5 minutes. The inner tube is placed in an outer centrifugal tube. The centrifuge SIGMA® 2–15 is started at 1800 rpm and centrifuges for 5 minutes. The inner tube with the sample is weighed ($M_2$) (see also DIN 53417).

$V_p=(M_2-M_1)/\delta P=(V_p/M_0)\cdot 1000$ $V_p$=volume of dibutyl phthalate absorbed (ml) $M_1$=weight inner tube+sample before sorption (g) $M_2$=weight inner tube+sample after sorption (g) $M_0$=weight sample before sorption (g) $\delta$=liquid density of dibutyl phthalate, 1.050 (g/ml) P=porosity of the compacted sodium silicate (ml/kg)

Mechanical Strength

In a stainless steel mill 50 g of compacted sodium silicate having a particle size between 400 and 1000 μm are subjected to 8 stainless steel balls having a diameter of 20 mm and a weight of approximately 32 g each. The mill has a diameter of 11.5 cm and a length of 10 cm, and rotates horizontally at a speed of 100 rpm. After 5 minutes the compacted sodium silicate is removed from the mill and sieved.

$M=c\cdot 100/a$ M=dust percentage (%) a=amount of compacted sodium silicate introduced into the mill (g) c=weight of the sieved sample having a particle size below 400 μm (g)

EXAMPLES 1–6 AND COMPARATIVE EXAMPLES A–B

A Niro® FSD spray-drier with the following characteristics was employed:

| | |
|---|---|
| T° inlet: | 260° C. |
| T° outlet: | 118° C. |
| TSFB: | 130° C. |
| T° feed: | 80° C. |
| Feed rate: | 2.8 m³/h |
| Pressure nozzle: | 164 bar |
| Air flow SFB: | 3250 m³/h |
| Burner load: | 89% |

An Alexander Werk® roller compactor with the following characteristics was employed:

| | |
|---|---|
| capacity: | 5.4–8.9 ton/h |
| roller speed: | 14–18 rpm |
| supplied power: | 250 kW |
| d rollers: | 75 cm |
| I rollers: | 36 cm |
| internal cooling: | 15° C. |
| speed feed screw: | var. |
| compactor pressure: | var. |
| flake thickness: | var. |

A sodium silicate solution of 39.24 wt % dry substance, having a molar ratio of 2.65, was introduced into the spray-drier. Subsequently, the spray-dried powder was introduced into a rotating drum provided with three nozzles to apply the above-mentioned sodium silicate solution to the powder at variable rates. The water glass treated sodium silicate powder was then passed to the roller compactor. The variable parameters and the properties of the resulting compacted sodium silicates are listed in the Table (I), below.

| | A | B | 1 | 2 | 3 | 4 | 5 | 6 |
|---|---|---|---|---|---|---|---|---|
| Water glass addition (l/h) | 100 | 115 | 160 | 120 | 130 | 140 | 160 | 140 |
| Speed feed screw (rpm) | 50 | 50 | 50 | 50 | 50 | 50 | 50 | 50 |
| Compacting pressure (bar) | 105 | 100 | 95 | 90 | 85 | 85 | 85 | 80 |
| Flake thickness (mm) | 7.8 | 7.9 | 8.3 | 8.0 | 8.1 | 8.1 | 8.1 | 8.0 |
| Porosity (ml/kg) | 181 | 189 | 238 | 205 | 218 | 210 | 204 | 225 |
| Bulk density (kg/m³) | 708 | 690 | 598 | 662 | 640 | 650 | 666 | 628 |
| Dust percentage (wt %) | 26.8 | 24.6 | 38.0 | 27.2 | 28.6 | 25.0 | 22.6 | 31.0 |

We claim:

1. Compacted sodium silicate having a molar ratio $SiO_2:Na_2O$ from 1.6 to 3.3, wherein the silicate has the following properties:
    a bulk density of above 500 g/l,
    a porosity of above 190 ml/kg, and
    a mechanical strength such that the dust percentage is below 40 wt %.

2. The compacted sodium silicate of claim 1 wherein the bulk density is in the range of from about 600 to 1000 g/l.

3. The compacted sodium silicate of claim 1 wherein the porosity is above 200 ml/kg.

4. The compacted sodium silicate of claim 1 wherein the dust percentage is below 35 wt %.

5. The compacted sodium silicate of claim 1 wherein the molar ratio $SiO_2:Na_2O$ is in the range of from 2.6 to 3.3.

6. The compacted sodium silicate of claim 1 wherein more than 96 wt % of the silicate has a particle size greater than 250 μm.

7. The compacted sodium silicate of claim 1 wherein less than 20 wt % of the silicate has a particle size greater than 1000 μm.

8. A process for the preparation of compacted sodium silicate according to claim 1 which comprises:
    spray-drying an aqueous solution of sodium silicate with a molar ratio $SiO_2:Na_2O$ from 1.6 to 3.3,
    treating the spray-dried powder with a water glass solution,
    subjecting the water glass treated powder to a compacting step, at a pressure of below 100 bar, and
    crushing the resulting flakes having a thickness of above 4 mm to obtain the compacted sodium silicate,
    wherein the outlet temperature during the spray drying step is above 114° C.

9. The process of claim 8 wherein the outlet temperature is from 117 to 130° C.

10. The process of claim 8 wherein the water glass solution has a dry material substance of 20 to 50 wt %.

11. The process of claim 8 wherein said spray dried sodium silicate powder is treated with 3 to 12% by weight of water glass solution, based on the sodium silicate powder.

12. The process of claim 8 wherein a pressure of from 70 to 90 bar is employed in the compacting step.

13. The process of claim 8 wherein the resulting flakes have a thickness from 6 to 10 mm.

14. A cleaning composition which comprises the compacted sodium silicate of claim 1.

15. Compacted sodium silicate having a molar ratio of $SiO_2:Na_2O$ from 1.6 to 3.3, wherein the silicate has the following properties:
    a bulk density of above 500 g/l,
    a porosity in the range of from 200 to 300 ml/kg, and
    a mechanical strength such that the dust percentage is below 40 wt %.

16. The compacted sodium silicate of claim 15 wherein the bulk density is in the range of from about 600 to 1000 g/l.

17. The compacted sodium silicate of claim 15 wherein the dust percentage is below 35 wt %.

18. The compacted sodium silicate of claim 15 wherein the molar ratio $SiO_2:Na_2O$ is in the range of from 2.6 to 3.3.

19. The compacted sodium silicate of claim 15 wherein more than 96 wt % of the silicate has a particle size greater than 250 μm.

20. The compacted sodium silicate of claim 15 wherein less than 20 wt % of the silicate has a particle size greater than 1000 μm.

* * * * *